United States Patent [19]

Krakauer

[11] 3,941,279

[45] Mar. 2, 1976

[54] ARTICLE VENDING APPARATUS

[76] Inventor: Merrill Krakauer, One Deer Path, Short Hills, N.J. 07078

[22] Filed: Apr. 30, 1974

[21] Appl. No.: 465,679

[52] U.S. Cl. .................................................. 221/86

[51] Int. Cl.$^2$........................................... B65G 33/04

[58] Field of Search ............ 221/69, 75, 82, 85, 86, 221/89, 90, 9; 198/64, 160, 164, 167

[56] References Cited

UNITED STATES PATENTS

| | | | |
|---|---|---|---|
| 737,665 | 9/1903 | Rupley | 221/86 |
| 2,795,702 | 6/1957 | Morris | 221/75 X |
| 2,919,795 | 1/1960 | Holohan | 221/69 X |
| 3,248,005 | 4/1966 | Joschico | 221/75 |
| 3,591,045 | 7/1971 | Sturrock | 221/75 |

*Primary Examiner*—Stanley H. Tollberg
*Attorney, Agent, or Firm*—Emory L. Groff, Jr.

[57] ABSTRACT

A vending apparatus includes a plurality of divider members each adapted to advance and discharge individual articles disposed upon a shelf by means of a feeder assembly including a driveable element having advancing means engaging the dividers. Upon actuation, the feeder assembly advances all dividers carried thereby until that divider immediately behind the forwardmost article reaches a discharge point at which time switch means are operated by that divider to cease actuation of the feeder assembly.

11 Claims, 7 Drawing Figures

FIG. 3.
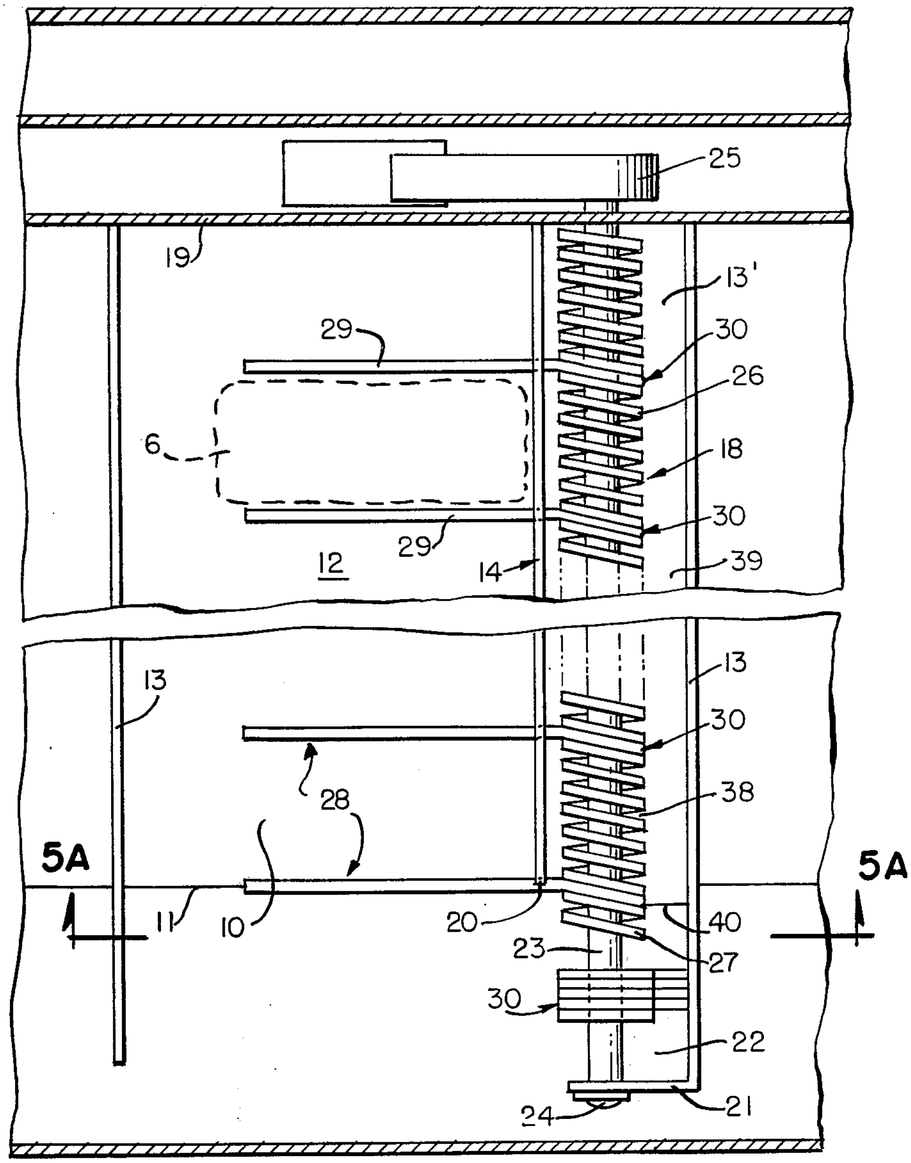
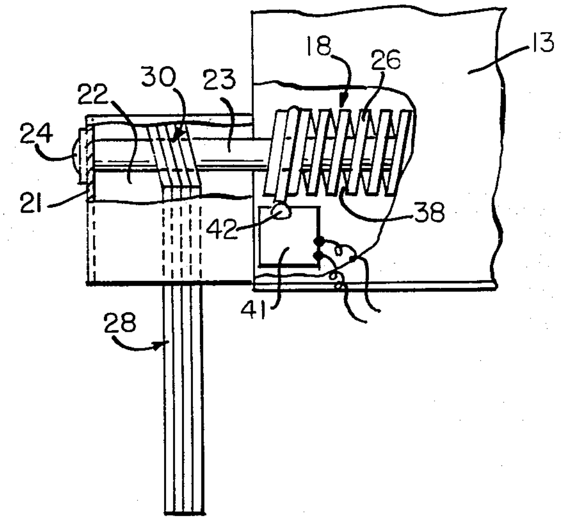
FIG. 4.

ARTICLE VENDING APPARATUS

This invention relates generally to vending machines and more particularly to an improved vending apparatus adapted to deliver selected packaged articles upon the actuation of one of a plurality of feeder assemblies including divider members selectively engageable with drive means at various points and overlying a supporting surface upon which packaged articles are disposed.

Coin-controlled vending machines incorporating driveable members for separating, retaining, advancing and discharging articles are generally well known and a popular construction has included a helical member, there being evidence of such devices in existence over 75 years ago as shown in the U.S. Pat. to Kibby, No. 481,280, issued Aug. 23, 1892. More recent examples of this general type of vending machine are shown in the U.S. Pats. to Krakauer et al, Nos. 3,269,595, issued Aug. 30, 1966, and 3,344,953, issued Oct. 3, 1967. The basic concept as found in the above cited examples and as practiced in many of the presently used vending machines of this type comprises the provision of a helical feeder element including a plurality of longitudinally spaced apart convolutions between which the articles to be vended are disposed such that subsequent driving or rotation of the feeder element will advance the thus disposed articles sequentially from one end of the feeder element to the other end thereof and from which they are discharged and become available for customer access.

Several disadvantages are inherent in such apparatus as above described. Noteworthy is the restriction upon the size of the article which may be stored, conveyed and discharged by means of such apparatus since the convolutions of the helical feeder element are equispaced and thereby limit the size of the articles which may be placed therebetween to a likewise equal dimension, which dimension is relatively thin. Additionally, many of the prior known devices require the provision of a helical feeder element having helices of relatively large diameter which has been necessitated by the requirement to provide adequate support and advancement means for the articles contained therebetween.

By the present invention an improved vending apparatus is provided including a feeder member which may be driven and serves to advance a plurality of separate dividers or discharge assistants, each of which may be selectively inserted into any one of a plurality of available spaces formed on the feeder member in a spaced apart manner relative to the next adjacent divider according to the dimensions of the packaged articles intended to be retained, advanced and discharged by that particular divider. In this manner it will be seen that for each feeder element a different longitudinal spacing may be provided between each pair of adjacent divider members so that for each feeder assembly any number of variably dimensioned articles may be associated therewith within the restriction of the length or capacity of that feeder assembly. Even if all the articles to be controlled by any one feeder assembly are of the same dimensions, the novel divider members of the present invention offer a unique operation in their cooperation with the feeder element and drive means therefor serving to advance and discharge these articles over a supporting shelf. A preferred arrangement for retaining and advancing the present dividers includes a feeder element comprising an elongated member having a helical periphery providing a plurality of convolutions extending the depth of the packaged article supporting shelf.

Accordingly, one of the primary objects of the present invention is to provide an improved vending apparatus including one or more driveable feeder assemblies, each having a plurality of variably positionable divider members removably attached thereto to retain, advance and discharge articles located there-adjacent.

Another object of the present invention is to provide an improved vending apparatus having an article storage compartment containing a plurality of articles each of which is retained, advanced and discharged therefrom by means of a transverse divider member overlying a supporting shelf and including drivable feeder means for simultaneously advancing all such dividers toward a discharge point, whereupon the forwardmost divider is automatically displaced from the storage compartment immediately prior to the discharge of the article there-behind.

Still another object of the present invention is to provide an improved article vending apparatus including a helical feeder assembly having a plurality of divider members removably insertable between selected convolutions of the feeder assembly to provide variable spacing between adjacent divider members and wherein the divider members are collected following discharge of their respective articles at a common point adjacent the distal portion of the feeder assembly.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings in which:

FIG. 3 is an enlarged horizontal plan view, partly in section, illustrating one of the feeder assemblies of the present invention.

FIG. 4 is a side elevation, partly broken away, of the forwardmost end of one of the feeder assemblies.

Similar reference characters designate corresponding parts throughout the several figures of the drawings.

Figure 1:
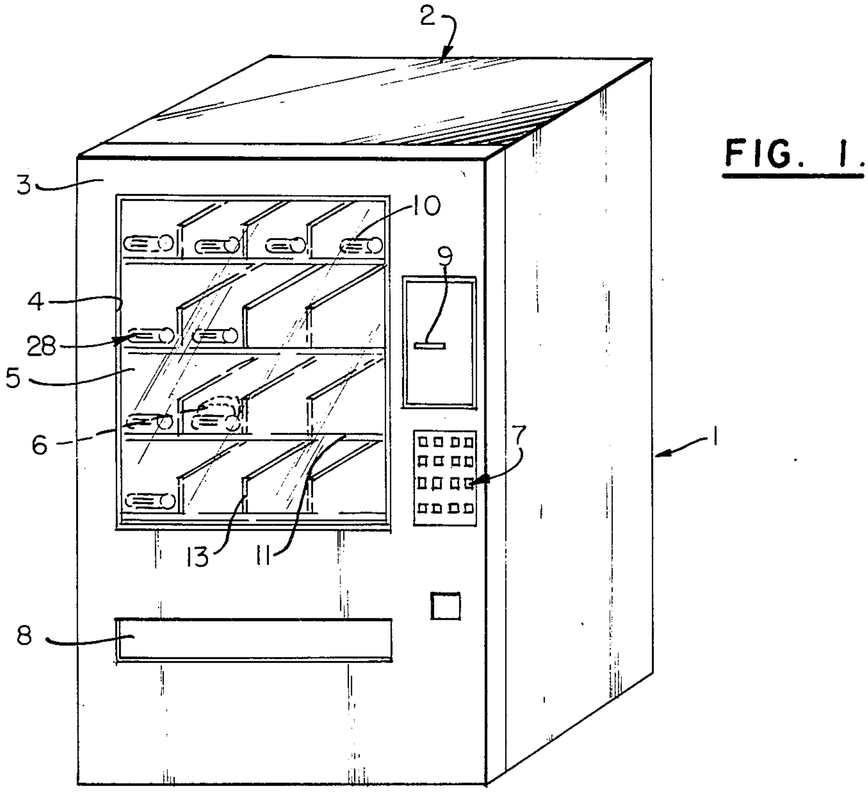
FIG. 1 is a perspective view of the article vending apparatus of the present invention.

Referring now to the drawings, particularly FIG. 1, the present invention will be understood to relate to a vending apparatus, generally designated 1, and having a cabinet or housing 2 which may assume any desirable configuration and preferably includes a front door 3 provided with a display opening 4 fitted with a transparent window 5 permitting of customer observation of the variety of packaged articles 6 located therebehind. Appropriate actuating buttons 7 are provided to initiate delivery of a selected article 6 to the delivery opening 8 following insertion of the required money in the coin slot 9. The specific construction of the attendant coin receiving mechanism as well as the actuating buttons 7 is immaterial relative the present invention and may be of any suitable construction as will be appreciated by those skilled in this art. Likewise, the final delivery chute communicating with the delivery opening 8 may be of any suitable design such as that shown in the above referenced U.S. Pat. No. 3,269,595.

Figure 2:
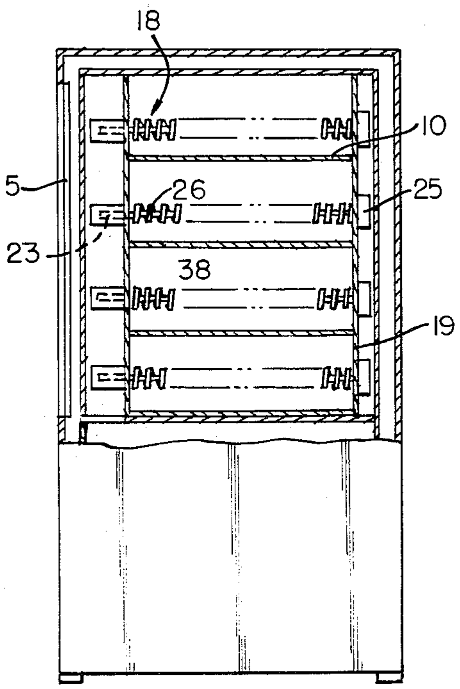
FIG. 2 is a side elevation, partly in section, of the apparatus of FIG. 1.

The essence of the present invention involves the unique structure for separating, retaining, advancing and discharging selected articles and is shown most clearly in FIGS. 2–6 of the drawings. Disposed within the cabinet 2 are a plurality of vertically stacked article supporting shelves 10 which preferably are mounted in a horizontal plane as shown in FIG. 2. Quite obviously, these shelves 10 may be inclined downwardly toward the window 5 to enhance the display feature of a plurality of articles 6 disposed thereupon, particularly if the cabinet 2 is of a rather large height although, unlike other known devices, inclination of the shelves 10 is not required to facilitate the advancement and discharge of the articles. Each shelf 10 terminates in a forward edge or discharge point 11 well spaced rearwardly of the window 5 and is divided into a plurality of longitudinally extending article storage compartments 12 by means of the vertical partitions 13. Each storage compartment 12 is further divided into a feeder element compartment 13′ by means of a vertical wall, generally designated 14, and which comprises an upper section 15 and lower section 16 having their opposed edges spaced apart to provide a longitudinal slot 17 as shown most clearly in FIG. 5A. The lateral and vertical dimensions of the storage compartments 12 are selected to ensure the accommodation, in an unrestricted manner, of all articles which are desired to be vended by the apparatus, while the feeder element compartment 13′ is of a minimal dimension sufficient to house the feeder assembly, generally designated 18, and which is shown most clearly in FIG. 3 of the drawings.

It will be understood that a feeder element compartment 13′ is associated with each article storage compartment 12. The dividing vertical wall 14 extends from rear wall 19 to a forward edge 20 located adjacent the forward edge 11 of the shelf 10, while the vertical partition 13 which likewise extends from the rear wall 19 projects well forward of the shelf forward edge 11 towards the cabinet window 5 and terminates in a front flange 21 angled inwardly toward the vertical wall 14 to define a divider member storage area 22 between the flange 21 and forward edge 11 of the shelf. The feeder assembly 18 includes a rod, shaft or core 23 which is suitably journaled in the front flange 21 as at 24 and extends rearwardly through the feeder element compartment 13′ to project through the rear wall 19, at which point the rod 23 is connected to suitable drive means 25. It is not necesary to discuss in detail the specific construction of the drive means since such mechanism is well known to those skilled in this art and may comprise any suitable electric motor mechanism adapted to impart rotary displacement to the rod 23 of the feeder assembly 18 following the insertion of the appropriate coin(s) into the slot 9 and the subsequent operation of one of the selector buttons 7.

The rod 23 of the feeder assembly 18 comprises a core or support for a continuous or uninterrupted flange or wire 26 radially projecting from the rod in a helical manner from a point adjacent the inner surface of the rear wall 19 to a forward distal portion 27 disposed adjacent the forward edge 11 of the shelf 10. Although the helical convolutions of the feeder assembly 18 are disclosed as a flange in the attached drawings, it will be readily appreciated that any equivalent structure may be employed such as a wire or screw auger which would result in the provision of a similar plurality of helical convolutions extending throughout the feeder element compartment 13′.

The packaged articles 6 intended to be vended by the subject invention are supported upon the upper surface of the shelf 10 within the confines of any one of the article storage compartments 12 and are retained, advanced and discharged therefrom by means of the divider members 28.

Figure 5A:
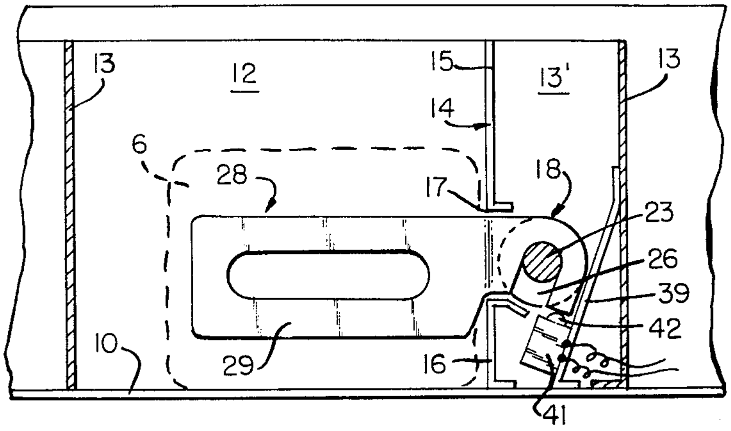
FIG. 5A is a vertical sectional view taken along the line 5A—5A of FIG. 3.

The unique cooperation between the divider members 28 and feeder assembly 18 of the subject invention will be readily appreciated by following the procedure employed during stocking of the various storage compartments 12 with packaged articles 6. The insertion of the divider members 28 into the horizontal use position is facilitated by either removably attaching the upper section 15 of the vertical wall 14 to the surrounding structure or by pivotally attaching its upper edge thereto so that it may be pivoted either outwardly into the storage compartment 12 or inwardly into the confines of the feeder element compartment 13′ while the drive heads 30 of the divider members are dropped between adjacent convolutions of the feeder assembly 18. The desired articles are placed within any one storage compartment 12 in a back-to-back manner from the rear wall 9 towards the forward edge 11 of the shelf 10 with but a minimal spacing between each pair of adjacent articles being required. A divider member 28 is provided behind and in front of each article disposed upon the shelf 10 and will appear as shown in FIGS. 3 and 5A wherein it will be seen that each divider member 28 comprises a main body 29 serving as an article engaging arm or bar and which extends transversely across the majority of the dimension of the article storage compartment 12 and above the underlying shelf 10. Attached to one end of each divider main body 29 is a drive head, generally designated 30, which will be seen to include a hook 31 defining an angled slot 32 inclined downwardly and toward the main body 29. The outermost edge of the hook 31 defines a support edge 33 and terminates in a foot 34, the purpose of which will be explained hereinafter. A substantially horizontal shoulder 35 connects the lower portion of the drive head 30 to the main body 29 and is disposed in a plane intermediate the top 36 and bottom 37 of the main body.

The individual divider members 28 are mounted upon the feeder assembly 18 by lowering the drive head 30 thereof between a selected clearance 38 formed by any two adjacent convolutions of the flange 26 so that the hook 31 of the divider member surrounds the rod 23 of the feeder assembly with the base of the slot 32 forming a mating fit about the rod 23 as shown most clearly in FIG. 5A of the drawings. Each drive head 30 is angled and curved to provide a configuration congruent with that of the clearance 38 provided between two adjacent convolutions of the feeder assembly flange 26 to provide minimal frictional engagement during rotation of the feeder assembly.

Figure 5B:
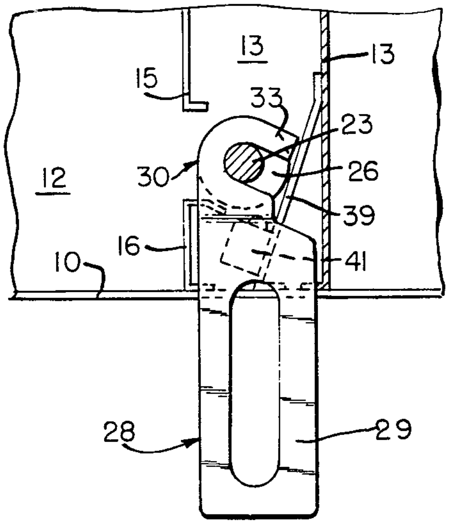
FIG. 5B is a front elevation illustrating one of the divider members as it appears in the forward storage area of the feeder assembly.
Figure 6:
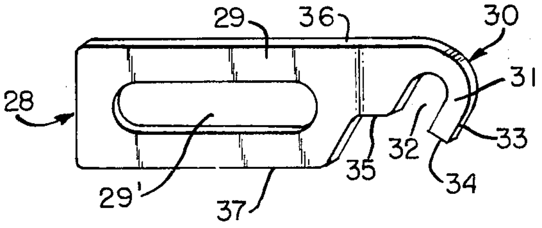
FIG. 6 is a perspective view of one of the divider members which serves as a discharge assistant in the present invention.

With the foregoing description in mind, it will follow that upon actuation of the feed drive means 25 the feeder assembly 18 will be rotated with a resultant advancement of the convolutions of the flange 26 thereof together with the captive divider members 28 disposed between certain adjacent pairs of these convolutions. Quite obviously the axial spacing between adjacent convolutions as defined by the clearances 38 is coordinated with the thickness of at least the drive head portion 30 of the divider members so as to preclude any binding therebetween and to ensure an effortless advancement of the article engaging arm 29 of the divider members from the rear of the respective storage compartment 12 toward the forward edge 11 of the adjacent shelf 10. The main body 29 of each divider member 28 is normally retained in a substantially horizontal position as shown in FIG. 5A by means of the inclined divider support plate 39 disposed within each feeder element compartment 13' and which extends from the rear wall 19 thereof to a point adjacent the front edge 11 of the shelf 10. In this manner, the sole support for each divider member 18 is provided by the rod 23 of the feeder assembly 18 and the sliding engagement between the support edge 33 of the divider member and the inclined support plate 39 until such time as actuation of the drive means 25 has advanced the divider member to a point juxtaposed the forward edge 40 of the inclined divider support plate 39 as illustrated in the forward-most divider plate shown in FIG. 3 of the drawings. It will thus follow that upon subsequent actuation of the feeder assembly 18 in this figure of the drawings, the forward-most divider plate will be moved past both the forward edge 11 of the shelf 10 and the forward edge 40 of the inclined support plate 39, thereby releasing the divider member support edge 33 from its heretofore juxtaposed relationship with the support plate 39 so that the weight of the main body 29 of the divider member will cause the divider member to swing downwardly in a counterclockwise motion with the drive head 30 pivoting about the feeder assembly rod 23 and will assume the suspended position as shown in FIGS. 4 and 5B of the drawings. Continued subsequent actuation of the feeder assembly 18 delivers successive ones of the divider members 28 past the shelf and divider support plate forward edges in a similar manner until all of the divider members associated within any one article storage compartment 12 are disposed in the suspended position upon the rod 23 within the confines of the storage area 22 immediately behind the vertical partition front flange 21. The elongated slot 29' provided in the divider member main body serves to reduce the weight of the divider member as well as improves the visibility of the article 6 therebehind.

When vending odd-shaped packages it may be desirable to provide positive means adjacent the forward portion of the feeder assemblies to ensure the downward displacement of each divider member 28 after being advanced past the forward edge of the shelf. In other words, it is conceivable that the divider body 29 may engage a particular article in such manner as to resist the force of gravity when clearing the forward edge 40 of the support plate 39. To counteract such instances, suitable cam means (not shown) may be provided within the area adjacent the forward edge of the shelf. Such cam means may comprise either a downwardly directed member on the upper vertical wall section 15 engageable with the divider top edge 36 or, an upwardly directed member on the support plate 39 engageable with the divider foot 34 which, in either instance, would forcefully urge the divider member to be arcuately displaced about the rod 23 as the feeder assembly is rotated.

In many of the prior known devices of this general type, mechanical or electrical timing means is usually provided to limit the actuation of the feeder assembly following depression of one of the buttons 7. Such regulating means usually limits rotation of the feeder assembly to a prescribed number of revolutions calculated to discharge the next article disposed between convolutions of the helical feeder assembly and since all of the articles are usually axially equi-spaced along the length of the feeder assembly it is not necessary to provide variable means for automatically regulating the amount of rotation of the feeder assembly upon the vending of each article. However, since the very objective of the present apparatus is to permit vending of articles of different dimensions from a same storage compartment 12 by means of the variable spacing between the plurality of divider members associated therewith it will be apparent that specific regulating means must be provided which is responsive to this variable spacing between subsequent divider members 28. Such control is achieved by the provision of a separate electrical switch 41 associated with each feeder element 18 as shown in FIGS. 4 and 5A of the drawings. This switch 41 contains a contact 42 located adjacent the forward edge 40 of the inclined divider support 39 and is normally disposed within the path of the foot 34 of the divider members 28. With the foregoing in mind it will be understood that when a coin(s) is inserted within the slot 9 and the desired button 7 is depressed, the appropriate drive means 25 will be actuated to begin rotation of its associated feeder assembly 18 and this rotation will continue until such time as the divider member 28 located immediately behind the forward-most article 6 has been advanced to the point where its foot 34 engages the switch contact 42 which will turn off the drive means 25 so that the forward-most divider member which served as the discharge assistant or "pusher" for the just vended article will be disposed as shown as the forward-most divider member in FIG. 3 of the drawings with its main body located immediately above the edge 11 of the shelf 10 and its drive head edge 31 still engaging the support plate 39 just short of the edge 40.

When the vending apparatus 1 is to be serviced, the door 3 is opened and any empty space in any one of the compartments 12 may be filled with packaged articles 6, each to be sandwiched between a pair of the divider members 28. Any of the divider members then located within the storage area 23 may be manually lifted from their suspended position about the rod 23 and placed in the horizontal position with their hook portion 31 disposed between a pair of adjacent convolutions of the feeder assembly flange 26 according to the dimensions of the respective articles adjacent thereto.

I claim:

1. An article vending apparatus including, a shelf adapted to provide the full support for a plurality of adjacent aligned articles disposed thereon, said shelf having a forward edge defining a discharge point, a feeder assembly disposed adjacent said shelf and having a longitudinal axis parallel to the alignment of said articles, said feeder assembly including an axial element having a helical periphery providing a plurality of helical convolutions, a divider member associated with and disposed behind each article upon said shelf and having a main body overlying said shelf, said divider members each including a drive head adjacent said main body laterally of said articles supported on said shelf and selectively engageable with said feeder assembly between any pair of said helical convolutions thereof to maintain said divider members in a fixed selected distance from one another, and driving means engaging said feeder assembly to rotate same while concurrently rotating said helical convolutions with each said divider member drive head engaged thereby advancing to displace said divider member main body toward said shelf forward edge until its associated article is pushed along said shelf and the forwardmost said article is pushed past said forward edge.

2. An article vending apparatus according to claim 1 wherein, said feeder assembly axial element includes a rod and said helical periphery comprises a continuous flange.

3. An article vending apparatus according to claim 1 including, a plurality of said feeder assemblies overlying said shelf, a partition adjacent each said feeder assembly providing one lateral limit of a storage compartment associated with each said feeder assembly, and said articles and said divider main bodies are disposed within said compartments prior to advancement to said shelf forward edge.

4. An article vending apparatus according to claim 1 including, switch means associated with said driving means and engageable by each said divider member upon its displacement to said shelf forward edge to cease actuation of said driving means to retain each said divider member adjacent said forward edge following discharge of its respective article from said shelf.

5. An article vending apparatus including, a shelf adapted to support a plurality of adjacent aligned articles, each shelf having a forward edge defining a discharge point, a feeder assembly disposed adjacent said shelf and having a longitudinal axis parallel to the alignment of said articles, said feeder assembly including an axial element provided with a helical periphery, a divider member associated with each article upon said shelf and having a main body overlying said shelf, said divider member including means adjacent said main body engageable with said feeder assembly between the helical convolutions thereof, said feeder assembly axial element extending forwardly of said shelf forward edge, said feeder assembly helical periphery terminating in a free end intermediate said shelf forward edge and the forwardmost terminus of said axial element to provide a divider member storage area, and driving means engaging said feeder assembly to rotate same while advancing its helical convolutions and said divider member toward said shelf forward edge until its associated article is pushed therepast.

6. An article vending apparatus according to claim 5 wherein, said divider member means adjacent said main body includes a drive head surrounding said feeder assembly axial element, said head pivotally attached to said feeder assembly and including a support edge, a support plate adjacent said feeder assembly terminating in a forward edge adjacent said shelf forward edge, said divider member support edge engaging said support plate to maintain said divider members substantially horizontally disposed when overlying said shelf whereby, when said divider members are advanced forwardly past said shelf forward edge and said head support edge passes said support plate forward edge said divider member pivots about said feeder assembly to a vertical position.

7. An article vending apparatus including, a shelf adapted to support a plurality of adjacent aligned articles, said shelf having a forward edge defining a discharge point, a feeder assembly disposed adjacent said shelf and having a longitudinal axis parallel to the alignment of said articles, said feeder assembly including an axial element provided with a helical periphery, a divider member associated with each article upon said shelf and having a main body overlying said shelf, said divider member including means adjacent said main body engageable with said feeder assembly between the helical convolutions thereof, said divider member means adjacent said main body including a drive head surrounding said feeder assembly axial element, and driving means engaging said feeder assembly to rotate same while advancing its helical convolutions and said divider member toward said shelf forward edge until its associated article is pushed therepast.

8. An article vending apparatus according to claim 7 wherein, said drive head is provided with a hook defining a substantially downwardly directed slot engageable with said axial element.

9. An article vending apparatus according to claim 6 including, switch means associated with said driving means and engageable by each said divider member head upon its displacement to said shelf forward edge to cease actuation of said driving means to retain each said divider member adjacent said forward edge following discharge of its respective article from said shelf.

10. An article vending apparatus according to claim 8 including, a wall adjacent said feeder assembly atop said shelf and provided with a longitudinal opening, said divider members disposed through said opening with said main body and said head on opposite sides of said wall.

11. An article vending apparatus including, a shelf adapted to support a plurality of adjacent aligned articles, said shelf having a forward edge defining a discharge point, a feeder assembly disposed adjacent said shelf, said feeder assembly having a peripheral surface defining a plurality of clearances thereon, drive means operable to actuate said feeder assembly to advance said clearances toward said shelf forward edge, a divider member associated with each article upon said shelf and having a main body overlying said shelf, each said divider member including means adjacent said main body selectively engageable with one of said feeder assembly clearances, whereby, upon actuation of said drive means all of said divider members overlying said shelf are advanced toward said forward edge and switch means ceasing activation of said drive means upon the advancement of each said divider member to a point adjacent said forward edge.

* * * * *